(12) United States Patent
Fleming, III

(10) Patent No.: US 6,597,772 B1
(45) Date of Patent: Jul. 22, 2003

(54) METHOD OF PROGRAMMING TELEPHONE NUMBERS AND IDENTIFIERS IN MULTIPLE DATABASES

(75) Inventor: Hoyt A. Fleming, III, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/217,065

(22) Filed: Dec. 21, 1998

(51) Int. Cl.$^7$ ................................................ H04M 3/44
(52) U.S. Cl. ............... 379/93.25; 455/564; 379/355.06; 379/93.24
(58) Field of Search ........................... 379/93.25, 93.24, 379/102.02, 355, 356, 355.06, 356.01; 455/418, 419, 564

(56) References Cited

U.S. PATENT DOCUMENTS

| | | |
|---|---|---|
| 5,247,565 A | 9/1993 | Joglekar et al. |
| 5,247,700 A | 9/1993 | Wohl et al. |
| 5,339,352 A | 8/1994 | Armstrong et al. |
| 5,452,346 A | 9/1995 | Miyamoto |
| 5,457,732 A | 10/1995 | Goldberg |
| 5,561,705 A | 10/1996 | Allard et al. |
| 5,568,546 A | 10/1996 | Marutiak |
| 5,689,547 A | 11/1997 | Mölne |
| 5,737,700 A | 4/1998 | Cox et al. |
| 5,764,731 A | 6/1998 | Yablon |
| 5,768,362 A | 6/1998 | Moon |
| 5,797,098 A | 8/1998 | Schroeder et al. |
| 5,828,956 A | 10/1998 | Shirai |
| 5,940,484 A | 8/1999 | DeFazio et al. |
| 5,940,752 A * | 8/1999 | Henrick ...................... 455/419 |
| 5,974,312 A * | 10/1999 | Hayes, Jr. et al. ........... 455/419 |
| 5,995,826 A | 11/1999 | Cox et al. |
| 6,049,796 A | 4/2000 | Siitonen et al. |
| 6,081,583 A | 6/2000 | Cheng et al. |
| 6,122,347 A | 9/2000 | Borland |
| 6,122,503 A * | 9/2000 | Daly ........................... 455/419 |
| 6,215,854 B1 | 4/2001 | Walance |
| 6,215,994 B1 * | 4/2001 | Schmidt et al. ............. 455/419 |
| 6,292,668 B1 * | 9/2001 | Alanara et al. ............. 455/466 |
| 6,321,098 B1 | 11/2001 | Beith et al. |
| 6,377,950 B1 * | 4/2002 | Peters et al. ................. 707/10 |
| 6,456,709 B1 | 9/2002 | Cox et al. |

FOREIGN PATENT DOCUMENTS

| | | |
|---|---|---|
| JP | 404126433 A | 4/2002 |
| WO | WO 94/30023 | 12/1994 |

OTHER PUBLICATIONS

Mobile Office DI 27. Mobile Office DI 27 for *GSM* 1900. http://www.ericsson.se/US/phones/data/dpy90131.htm (Nov. 15, 1998).

U.S. patent application Ser. No. 09/217,254, Fleming, III, filed Dec. 21, 1998.

U.S. patent application Ser. No. 09/217,255, Fleming, III, filed Dec. 21, 1998.

U.S. patent application Ser. No. 09/241,426, Fleming, III, filed Feb. 2, 1999.

U.S. patent application Ser. No. 2002/0004382, Cox et al., filed Jan. 10, 2002.

* cited by examiner

Primary Examiner—Stella Woo
(74) Attorney, Agent, or Firm—Perkins Coie LLP (57) ABSTRACT

A method and apparatus for automatically updating a group of databases when new information is entered into any one of the databases in the group is disclosed. When a first database is updated with new information, a phone call, page or email is sent to the other databases. The updated database sends the new information to the other databases via the phone call, page or email, and the new information is stored in each database. In this manner, the information contained in each associated database will be kept current and accurate without requiring manual re-entry of the new information into each separate database.

50 Claims, 6 Drawing Sheets

METHOD OF PROGRAMMING TELEPHONE NUMBERS AND IDENTIFIERS IN MULTIPLE DATABASES

BACKGROUND OF THE INVENTION

1. Field of the Invention

The present invention relates to the field of telephones and, more particularly to a method of programming telephone numbers and alphanumeric identifiers into a plurality of databases.

2. Description of the Related Art

In recent years, public use of wireless communication devices, such as wireless telephones, has increased greatly. Wireless telephones, such as cellular telephones, are typically either independently powered hand-held units or are mounted in vehicles.

Because of their mobility, wireless telephones must be light and compact. A user needs to be able to comfortably carry the telephone in a pocket, purse or briefcase. For example, it is common for a wireless telephone to have only a liquid crystal display (LCD), a numeric keypad, a very limited number of control buttons, such as a clear/end button, a send button and a power button. A personal digital assistant (PDA) incorporating a wireless telephone might include a touch sensitive or pen-based screen in addition to the above list of user-interface devices.

In recent years, wireless telephones have been manufactured with operating features identical to those found in conventional telephones. In addition, wireless telephones have also been manufactured with advanced paging and PDA features. Despite all of the technological advancements, wireless telephones are not without their shortcomings. For example, today's wireless telephones allow a user to program their frequently dialed telephone numbers into the memory of their telephone, but this programming function must be performed manually. Manual programming of the wireless telephone can take time and requires the user to remember how to perform the steps required to carry out the programming function.

Moreover, most wireless telephones also allow the user to associate and program an alphanumeric identifier for each telephone number stored in the telephone's memory. These alphanumeric identifiers may then be used to quickly recall and dial a stored telephone number without requiring a user to remember the called party's telephone number. Unfortunately, this programming function must also be performed manually and suffers from at least the same drawbacks associated with the programming of telephone numbers.

Additionally, in many instances the owner of a wireless telephone maintains more than one database in which telephone numbers and associated alphanumeric identifiers are stored. For example, a database could reside in a personal computer located in a work environment, another database could reside in a personal computer located in a home environment or in a PDA, and another database could reside in a wireless telephone. When a new telephone number, a change in an existing telephone number, or a change in the associated alphanumeric identifier of an existing telephone number is desired to be entered to update the databases, it must be manually entered into each database separately. The manual entry of data into each separate database can take time and requires the user to remember to update each separate database and also the steps required to update each database. Typically, unless the user is extremely vigilant in updating every database, the end result is that each database may contain information different from the other databases or old information that is no longer accurate.

Thus, there exists a need for a system to maintain a plurality of databases that avoids having to re-enter telephone numbers and associated alphanumeric identifiers separately into each of the databases.

SUMMARY OF THE INVENTION

The present invention provides a method and apparatus for automatically updating a group of databases when new information is entered into any one of the databases in the group.

In accordance with the present invention, when a database is updated with new information, a phone call, page or email is sent to the other databases. The updated database sends the new information to the other databases via the phone call, page or email, and the new information is stored in each database. In this manner, the information contained in each associated database will be kept current and accurate without requiring manual re-entry of the new information into each separate database.

These and other advantages and features of the invention will become apparent from the following detailed description of the invention which is provided in connection with the accompanying drawings.

DETAILED DESCRIPTION OF PREFERRED EMBODIMENTS

The present invention will be described as set forth in the preferred embodiment illustrated in FIGS. 1–6. Although the invention is described below in the context of a wireless cellular telephone, the invention is not so limited and may be used with any type of telephone or other communications device where a series of numbers and/or symbols must be entered to establish a connection to a called party. Accordingly, the below detailed description of use of the invention with a cellular telephone is only representative and not limiting of the invention. Other embodiments may be utilized and structural, logical, or programming changes may be made without departing from the spirit or scope of the present invention.

Figure 1:
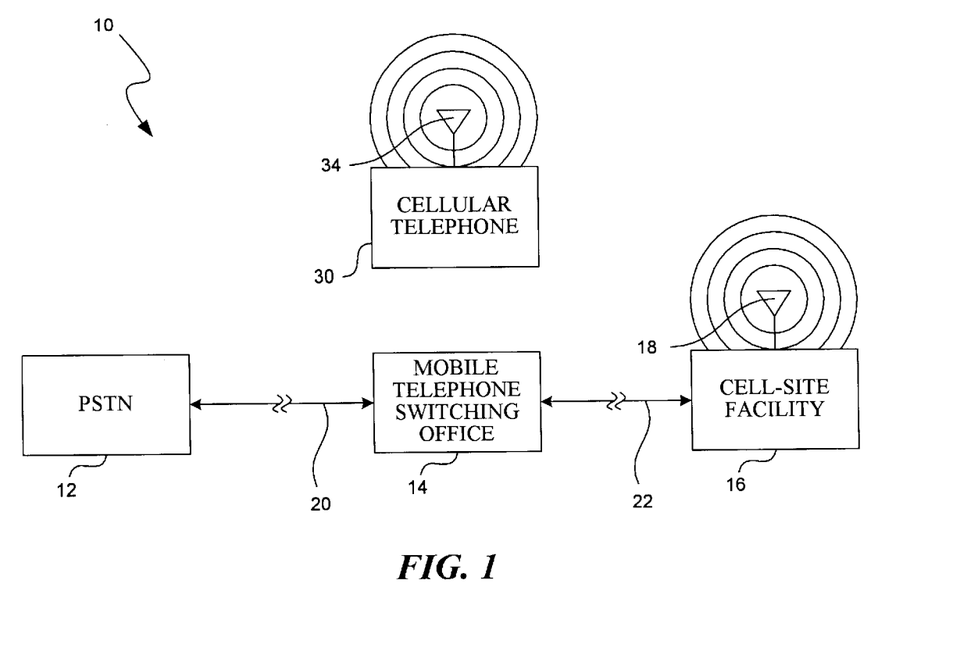
FIG. 1 illustrates a block diagram of a wireless telephone system which can be used to practice the present invention.

FIG. 1 illustrates a block diagram of a cellular telephone system 10 which can be used to practice the present invention. The system 10 includes a Mobile Telephone Switching Office (MTSO) 14 connected to a Public Switched Telephone Network (PSTN) 12 by telephone line 20. The MTSO 14 is connected by a telephone line 22 to cellular telephone facility 16 (also referred to herein as a "cell-site facility 16"). The cell-site facility 16 includes an antenna 18 for transmitting voice and digital information via various voice and digital channels to an antenna 34 of a cellular telephone 30. The antenna 18 of the cell-site facility 16 is also used to receive voice and digital information via the various voice and digital channels from the antenna 34 of the cellular telephone 30. It must be noted that the system 10 could include more cell-site facilities 16 and cellular telephones 30 if so desired, but only one of facility 16 and telephone 30 are illustrated for convenience purposes.

The present invention is implemented on the telephone side by the provision of some additional programming of the telephone controller to enable the telephone to carry out the operations described herein. The invention may be implemented in any conventional telephone, such as a cellular telephone, which includes a controller to control the complex functions of the cellular telephone. Thus, the invention is not restricted to any particular cellular telephone circuit architecture.

Figure 2:
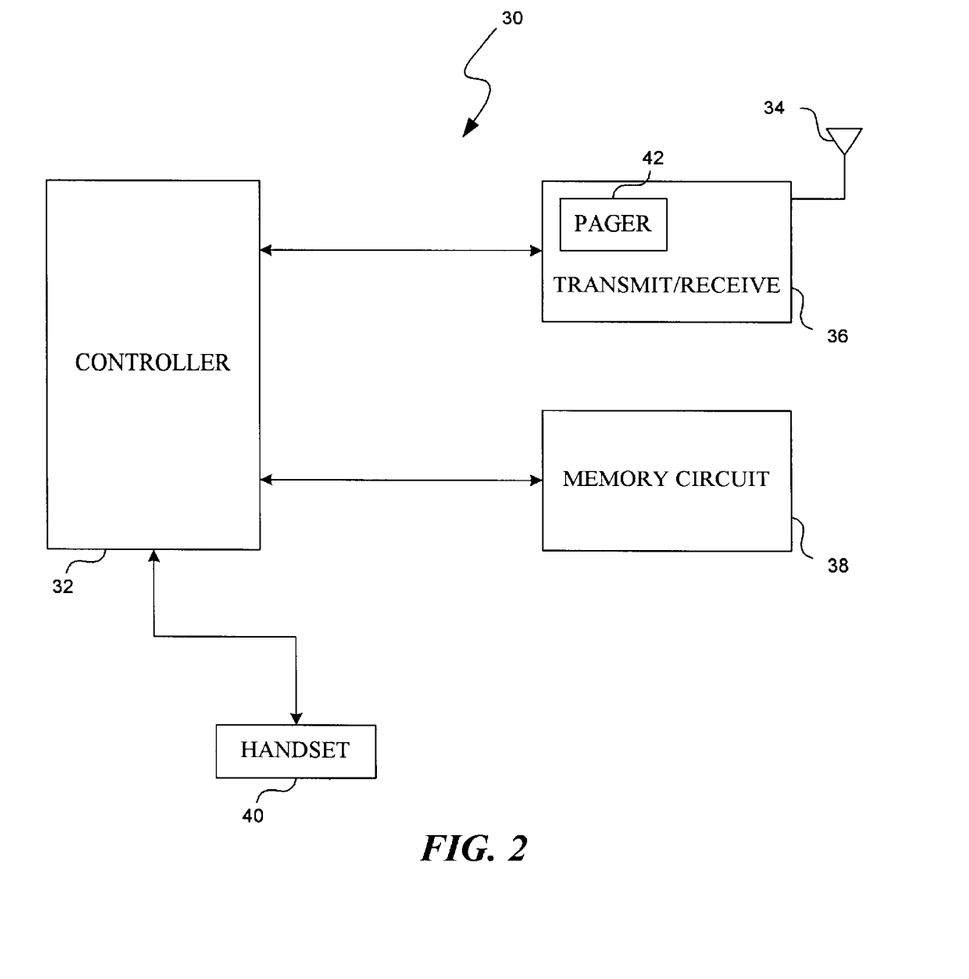
FIG. 2 illustrates a block diagram of an exemplary wireless telephone used in the system of FIG. 1.

U.S. Pat. No. 5,109,403 to Sutphin shows one representative telephone circuit and associated controller which can be programmed to implement the present invention and the disclosure of this patent is incorporated herein by reference. The '403 patent includes a controller which interacts with various other circuits to enable the telephone to perform its cellular telephone operations. The controller is further programmed as described below to implement the invention. FIG. 2 illustrates in high level block diagram form the cellular telephone 30 of FIG. 1. Cellular telephone 30 may include a controller 32, transmit/receive circuitry 36, memory circuit 38, antenna 34 and a handset representative of the telephone disclosed in the '403 patent. Controller 32 typically includes a microprocessor that coordinates the functions of telephone 30. Telephone 30 is capable of receiving and placing telephone calls via antenna 34. Transmit/receive circuitry 36 may include an integrated pager 42 which is capable of receiving numeric and/or alphanumeric signals from a wide area commercial paging system and for delivering those signal to handset controller 32. Memory circuit 38 may contain a database that stores information, such as telephone numbers, alphanumeric identifiers which have been assigned to each telephone number, and other information that has been programmed by the user. It is preferable that memory circuit 32 comprise a non-volatile memory.

Figure 3:
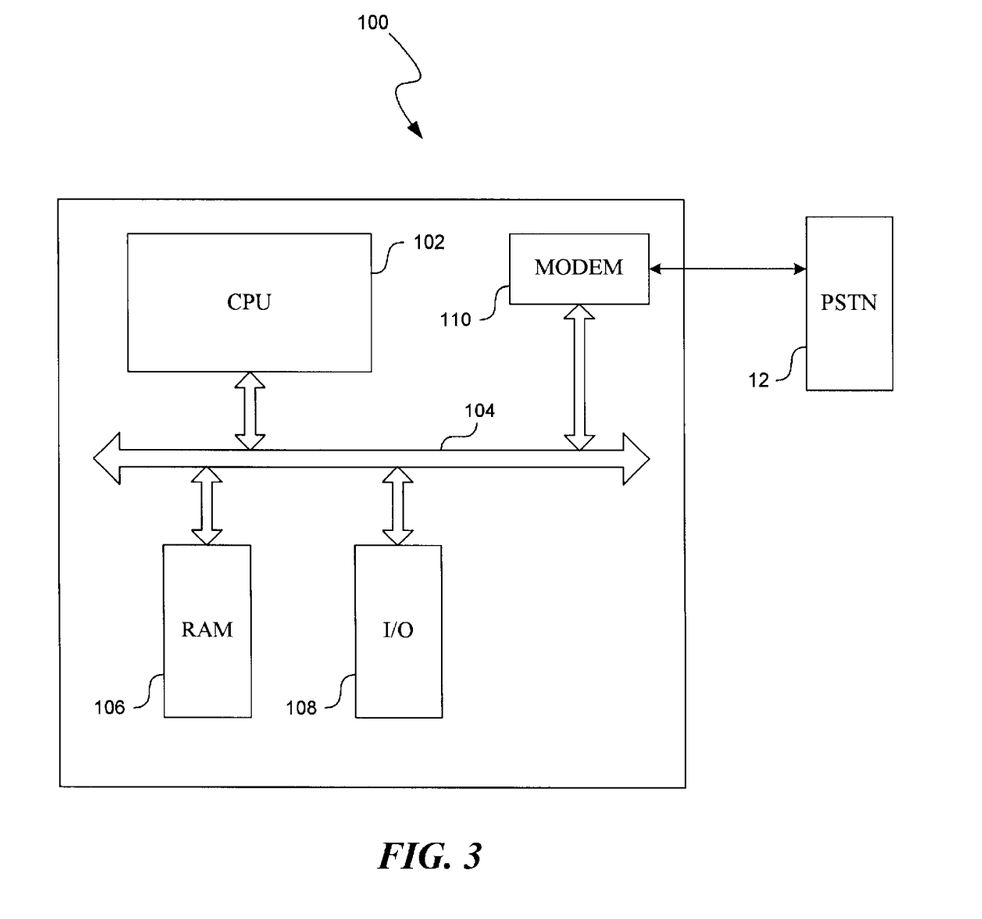
FIG. 3 illustrates a block diagram of a personal computer that may be used in accordance with the present invention.

FIG. 3 illustrates in block diagram form a personal computer 100 that may be used for storing and maintaining a database. Personal computer 100 includes a central processing unit (CPU) 102 connected to a bus 104. CPU 102 typically includes a microprocessor which may be any conventional general purpose single- or multi-chip microprocessor. In addition, the microprocessor may be any conventional special purpose microprocessor such as a digital signal processor or a graphics processor. Personal computer 100 further includes a memory device 106, such as a RAM, an input/output device 108 such as a keypad and display, and a modem 110. RAM 106, I/O 108, and modem 110 communicate with CPU 102 via bus 104. Modem 110 provides computer 100 with connection to PSTN 12. RAM 106 may contain a database that stores information, such as telephone numbers, alphanumeric identifiers which have been assigned to each telephone number, and other information that has been programmed by the user. It is preferable that memory device 106 comprise a non-volatile memory.

A user may typically have access to a plurality of personal computers such as computer 100, such as for example a personal computer located in a work environment and a second personal computer located in a home environment. Thus, there may be several separate databases containing similar information that a user maintains. For example, a user may wish to store frequently called telephone numbers and associated alphanumeric identifiers in the database in memory circuit 38 of telephone 30, in the database of RAM 106 of computer 100 in a work environment, hereinafter referred to as a work computer, and in the database of RAM 106 of computer 100 in a home environment, hereinafter referred to as a home computer. In accordance with the present invention as described below, when any one of the databases in telephone 30 or computer 100 in the work environment or computer 100 in the home environment is updated with new or revised information, the other databases are automatically updated to include the new or revised information as well.

Figure 4:
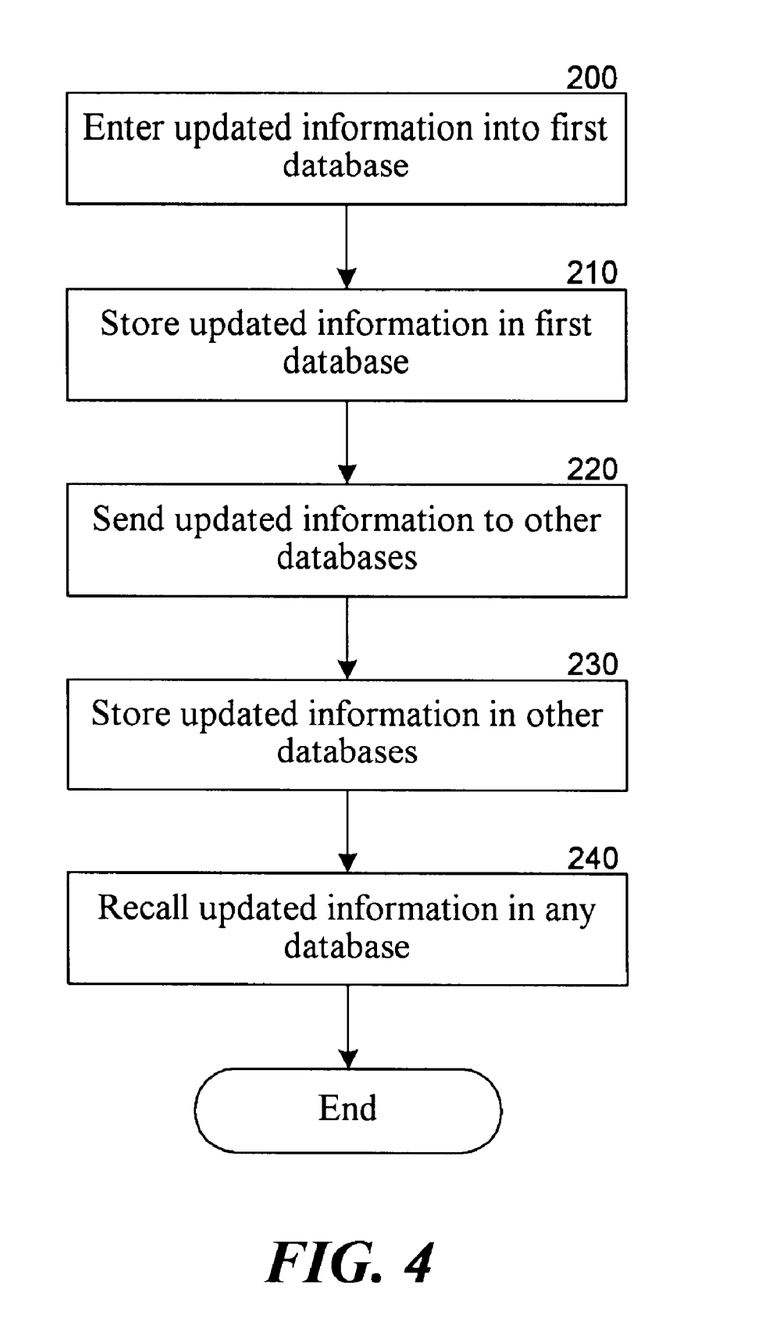
FIG. 4 is a flow chart illustrating one embodiment of an exemplary process for maintaining multiple databases in accordance with the present invention.

FIG. 4 illustrates a method for maintaining multiple databases. Although the invention is described below with respect to three separate databases, i.e., one in a telephone, one in a personal computer in a work environment, and one in a personal computer in a home environment, the invention is not so limited. Any number of databases can be maintained in accordance with the present invention. In addition, the databases may reside in one or more telephones, one or more personal computers, or any other device as is known in the art, such as a PDA, which includes the hardware for maintaining a database and hardware for communicating with other devices in any conventional method as is known in the art.

In step 200, updated information is entered into a first database. Updated information may include new information, such as a new telephone number, and/or revised information for information previously entered. For example, assume updated information is entered into the database of work computer 100. The entry of the updated information may be done by any method, such as for example manual entry, voice activation, or any other methodology or mechanism for entering information into a database. The information entered into in the database typically would include at least a telephone number and an alphanumeric identifier that has been assigned to the telephone number. The types of information that could be included in the alphanumeric identifier may include the name of the party assigned to the telephone number, the street address, city, state and zip code of the party assigned to the telephone number, other phone numbers of the party assigned to the telephone number, an email address of the party assigned to the telephone number, and so forth. Revised information may be entered in the case where information included in a previously entered alphanumeric identifier or telephone number changes.

In step 210, the updated information is stored in the database of work computer 100. In step 220, the updated information may be sent from the database in work computer 100 to other databases, such as for example the database in home computer 100 and the database in cellular telephone 30. In accordance with the present invention, CPU 102 is programmed to establish a communication link with other predetermined devices, such as home computer 100 and telephone 30, and transfer the updated information to those devices. The updated information may be sent from work computer 100 to the other devices electronically, such as for example via a telephone call, page or email. For example, work computer 100 may contact cellular telephone 30 and home computer 100 via a telephone call, page or email through modem 110. The work computer 100, using the telephone call, page or email, sends the updated information to telephone 30 and home computer 100. In step 230, the updated information is stored in the databases in telephone 30 and home computer 100. After the information has been stored in each database, the stored information can be recalled in step 240 in any of the databases by entering or selecting the telephone number or alphanumeric identifier.

If updated information is entered into the database of telephone 30, the databases of home computer 100 and work computer 100 may be updated in a similar manner as described above utilizing controller 32 of telephone 30. Likewise, if updated information is entered into the database of home computer 100, the databases of telephone 30 and work computer 100 may also be updated in a similar manner as described above. Thus, a user need only enter updated information into a first database and the updated information will automatically be sent and stored in other databases.

Figure 5:
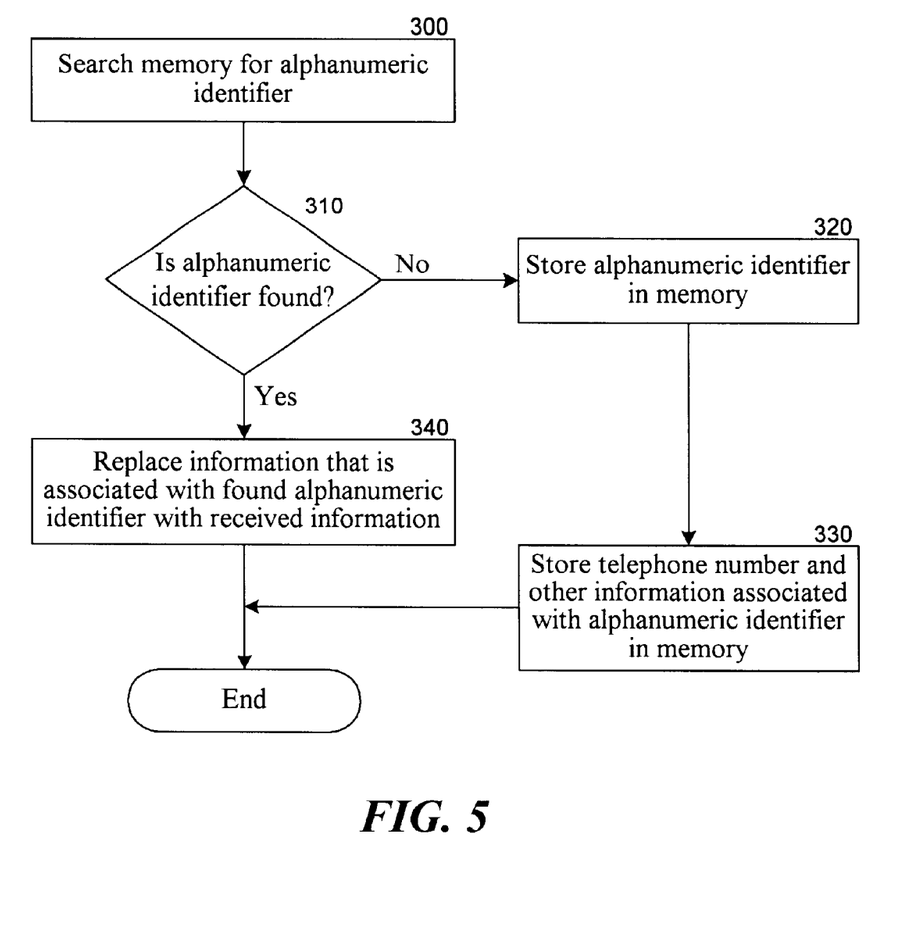
FIG. 5 is a flow chart illustrating an exemplary process for storing updated information in a database in accordance with one embodiment of the present invention.

FIG. 5 illustrates in flow chart form a method of storing updated information in any of the databases as illustrated in steps 210 and 230 of FIG. 4. After the updated information, including the alphanumeric identifier associated with the updated information, has been entered in step 200 or sent to the other databases in step 220, the database memory is searched, in step 300, for the alphanumeric identifier which is associated with the entered or received updated information. In step 310, it is determined if the alphanumeric identifier is found in the memory. If the alphanumeric identifier is not found (a NO response in step 310), the alphanumeric identifier is assigned to a memory location by the controller or CPU and stored in the memory in the assigned memory location in step 320. In step 330, the telephone number and other information associated with the just stored alphanumeric identifier are stored in the memory along with the alphanumeric identifier.

If the alphanumeric identifier is found in the memory (a YES response in step 310), the information that is currently stored with the alphanumeric identifier is replaced with the information just entered or received.

A description of several methods for sending the updated information from the database into which it has been entered, such as for example work computer 100, to the other databases, such as for example home computer 100 and telephone 30, will now be provided. The methods for the transfer of data between two or more computers are well known in the art and will not be described here.

When a telephone call between a cellular telephone 30 and a computer, such as for example work computer 100, is initiated, MTSO 14 assigns an available voice channel to the user's cellular telephone 30 as is known in the art. The telephone 30 then tunes itself to the available frequency of the assigned channel. The MTSO 14 couples the cell-site facility 16 proximate to the user's telephone 30 to the phone line connected to work computer 100 via the Public Switched Telephone Network (PSTN) 12. When the call is answered, a voice channel is established between the computer 100 and the user's telephone 30 (via the cell-site 16 and MTSO 14). At this point, conventional login/handshaking between the telephone 30 and modem 110 of computer 100 occurs. Once the login/handshaking is completed, digital data may be transmitted between the computer 100 and the telephone 30.

If the telephone 30 has an integrated pager 42, the home or work computer 100 may also transmit the updated information via a subsequent page to the telephone 30 utilizing a commercial paging network as is known in the art. Alternatively, the updated information may be sent from home or work computer 100 to telephone 30 via a page utilizing an email from home or work computer 100. Many modern email systems, such as for example Microsoft Outlook, allow a user to send a page to a user by sending an email. Paging using an email system is known in the art and will not be described here. If the telephone 30 is provided with an email capability, the work or home computer 100 may also transmit the updated information via a subsequent short message service (SMS) email to the user's telephone 30.

If an email or page is used to send the updated data, a command comprised of a text string included in the email or page can be used to indicate that updated data is being sent. For example, an email or page could contain the following text string: "//pdn 123-456-7890 John Doe." The //pdn command could signify that a "new" entry needs to be added in the database. Similarly, a "//pdu" command could indicate that an entry in the database needs to be updated, i.e., either the name, telephone number, or other information has changed. It is important to note that the above commands are merely examples and the text string need not be readable by a human.

If the telephone 30 or work or home computer 100 receives a page or email with updated information to be stored in its database, the respective database can be automatically updated and the email can be automatically deleted without any user intervention. Furthermore, the user need not be notified of the page or email.

Figure 6:
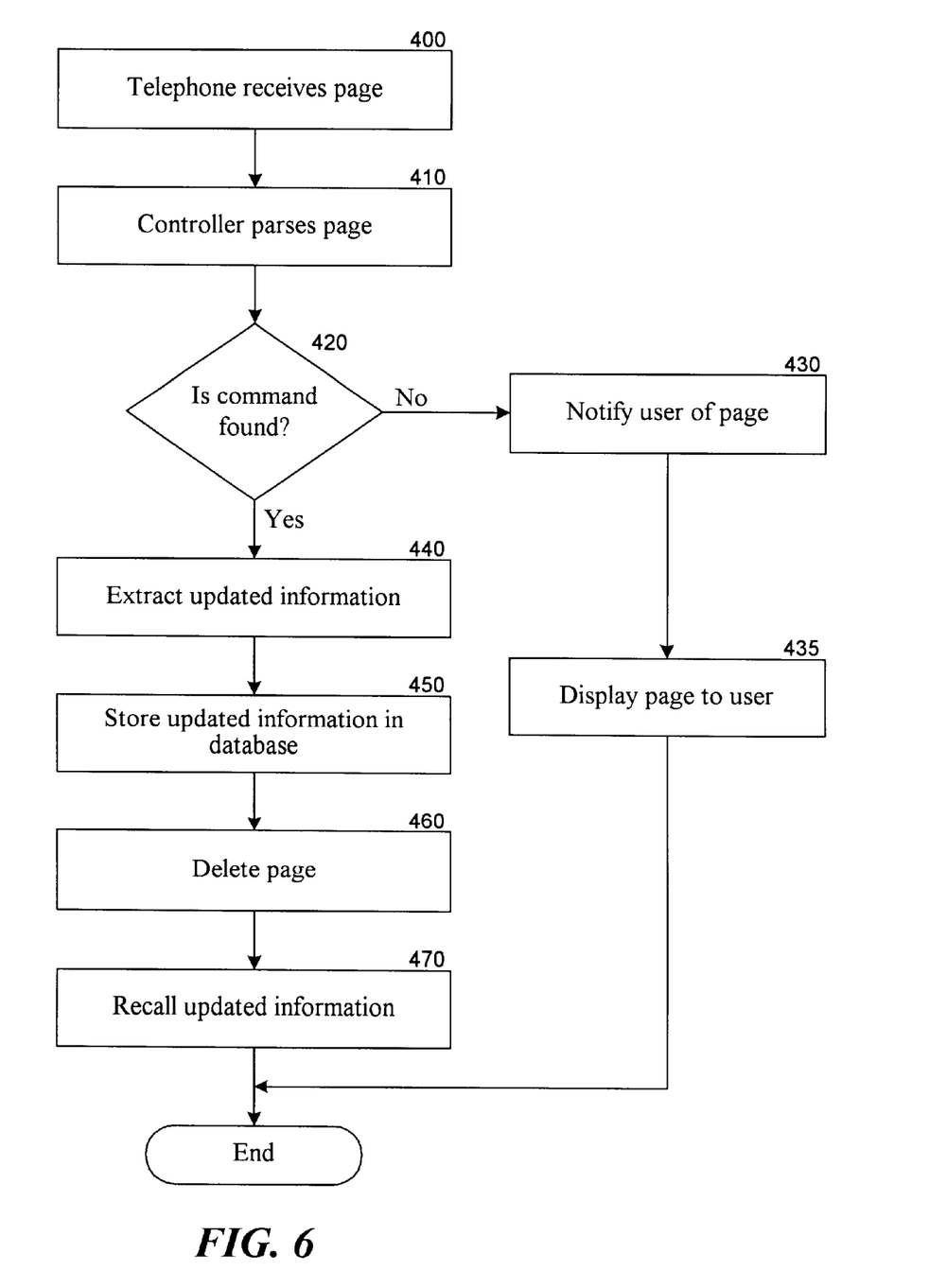
FIG. 6 is a flow chart illustrating an exemplary process for storing updated information in a telephone database utilizing a page to send the updated information.

FIG. 6 illustrates in flow chart form a method of maintaining a database of telephone 30 if the telephone 30 receives a page containing the updated information. In step 400, a page containing updated information is received by telephone 30. The page may contain a specific command comprised of a text stream which indicates that updated data is being sent. In step 410, the controller 40 may parse the page to determine if the specific command is included in the page. In step 420, it is determined if the specific command is included in the page. If a command is not found (a NO response in step 420), then the user may be conventionally notified of the page in step 430. In step 435, the page may be displayed to the user in a conventional method as is known in the art. If a command is found (a YES response in step 420), then controller 40 may continue to parse the page to extract the updated information in step 440. After the updated information has been extracted, controller 40 may update the database contained in RAM 52 in step 450 with the updated information received in step 400. In step 460, the page is deleted without intervention by the user. In step 470, the updated information stored in the RAM of telephone 30 may be recalled by the user and a call placed to the telephone number included in the updated information.

The present invention may be implemented in software and the software instructions and data can be stored in PROM, EEPROM or other non-volatile memory of the telephone 30 or computer 100. The present invention can be stored on a hard drive, floppy disc, CD-ROM or other permanent or semi-permanent storage medium and subsequently transferred to the memory of the telephone 30 or computer 100. The program embodying the present invention can also be divided into program code segments, downloaded, for example, from a server computer or transmitted as a data signal embodied in a carrier wave to the telephone as is known in the art.

Thus, in accordance with embodiments of the present invention, when a first database, such as a database in a telephone memory circuit, is updated with new information, a phone call, page or email is sent to databases contained in other devices, such as a work computer or home computer. The updated database sends the new information to the other databases via the phone call, page or email, and the new information is stored in each database. In this manner, the information contained in each associated database will be kept current and accurate without requiring manual re-entry of the new information into each separate database.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of storing at least one telephone number and information associated with said telephone number in a plurality of databases, at least one of said plurality of databases comprising a telephone database located in a telephone, said method comprising:

entering said at least one telephone number and associated information into a first of said plurality of databases;

storing said at least one telephone number and associated information in said first database;

sending said at least one telephone number and associated information to the telephone database;

receiving said at least one telephone number and associated information by the telephone database;

searching the telephone database for said associated information;

determining if said associated information is already in the telephone database;

storing said at least one telephone number and associated information in the telephone database if said associated information is not found; and replacing stored information associated with said associated information with said entered telephone number and associated information if said associated information is found.

2. The method according to claim 1, wherein said act of entering further comprises:

manually entering said at least one telephone number and associated information into said first database.

3. The method according to claim 1, wherein said act of entering further comprises:

entering said at least one telephone number and associated information including an alphanumeric identifier associated with said at least one telephone number.

4. The method according to claim 3, wherein said act of storing in said first database further comprises:

searching said first database for said entered alphanumeric identifier;

determining if said alphanumeric identifier is already in said first database;

storing said alphanumeric identifier and telephone number and associated information in said first database if said alphanumeric identifier is not found; and replacing stored information associated with said alphanumeric identifier with said entered telephone number and associated information if said alphanumeric identifier is found.

5. The method according to claim 3, wherein:

said act of searching the telephone database comprises searching for said entered alphanumeric identifier;

said act of determining if said associated information is already in the telephone database comprises determining if said alphanumeric identifier is already in the telephone database; and said act of storing said telephone number and associated information in the telephone database if said alphanumeric identifier is not found comprises storing said alphanumeric identifier and telephone number and associated information in the telephone database.

6. The method according to claim 1, wherein said act of sending further comprises:

sending said at least one telephone number and associated information to the telephone database via an email or a page.

7. The method according to claim 6, further comprising:

using a text string to indicate to the telephone database that said at least one telephone number and associated information is being sent.

8. The method according to claim 7, further comprising:

deleting said email after said at least one telephone number and associated information has been stored in the telephone database.

9. The method according to claim 6, further comprising:

using a command in said email or page to indicate to the telephone database that said at least one telephone number and associated information is being sent.

10. The method according to claim 9, wherein after said email or page has been received by the telephone database, said method further comprises:

parsing said email or page to determine if said command is found;

notifying a user of said email or page if said command is not found; and extracting said at least one telephone number and associated information if said command is found.

11. The method according to claim 10, further comprising:

deleting said email or page after said at least one telephone number and associated information has been stored or replaced in the telephone database.

12. The method according to claim 1, further comprising:

recalling said stored at least one telephone number and associated information from said first database or the telephone database.

13. A telephone comprising:

a memory circuit; and a controller coupled to said memory circuit, said controller adapted to:

search said memory circuit after the telephone has electronically received at least one telephone number and an alphanumeric identifier associated with said telephone number from at least one other memory circuit which is external to said telephone, the act of searching said memory circuit comprising searching for said alphanumeric identifier;

storing said alphanumeric identifier and telephone number in said memory circuit if said alphanumeric identifier is not found; and replacing information associated with said alphanumeric identifier in the memory circuit with said telephone number and alphanumeric identifier if said alphanumeric identifier is found.

14. The telephone according to claim 13, wherein said telephone is adapted to receive said telephone number and alphanumeric identifier via an email, the controller being further adapted to analyze the email for a text string to indicate to said controller that said at least one telephone number and alphanumeric identifier are being sent.

15. The telephone according to claim 14, wherein said controller is further adapted to delete said email after said at least one telephone number and associated information have been stored in said memory circuit.

16. The telephone according to claim 13, wherein said telephone is adapted to receive said telephone number and alphanumeric identifier via an email, the controller being further adapted to analyze the email for a command to indicate to said controller that said at least one telephone number and alphanumeric identifier are being sent.

17. The telephone according to claim 16, wherein said controller is further adapted to delete said email after said at least one telephone number and associated information have been stored in said memory circuit.

18. The telephone according to claim 13, wherein said controller is further adapted to store at least one telephone number and associated information that has been entered by a user in said memory circuit.

19. The telephone according to claim 18, further comprising:
a keypad for manually entering said at least one telephone number and associated information into said controller.

20. The telephone according to claim 18, wherein said controller is further adapted to electronically send said at least one telephone number and information associated with said telephone number that has been entered by said user to said at least one other memory circuit.

21. The telephone according to claim 20, wherein said controller sends said at least one telephone number and associated information to said at least one other memory circuit via a telephone call.

22. The telephone according to claim 20, wherein said controller sends said at least one telephone number and associated information to said at least one other memory circuit via an email.

23. The telephone according to claim 22, wherein said email sent by said controller further comprises:
a text string to indicate to said at least one other memory circuit that said at least one telephone number and associated information are being sent.

24. The telephone according to claim 20, wherein said controller sends said at least one telephone number and associated information to said at least one other memory circuit via a page.

25. The telephone according to claim 24, wherein said page further comprises:
a command to indicate to said at least one other memory circuit that said at least one telephone number and associated information are being sent.

26. The telephone according to claim 13, wherein said controller is adapted to enable a user to use said alphanumeric identifier associated with said at least one telephone number to retrieve and dial said at least one telephone number.

27. The telephone according to claim 13, wherein said controller includes a processor.

28. A telephone system comprising:
at least one telephone comprising:
a memory circuit; and
a controller coupled to said memory circuit, said controller adapted to:
search said memory circuit after the telephone has electronically received at least one telephone number and an alphanumeric identifier associated with said telephone number from at least one other memory circuit which is external to said telephone, the act of searching said memory circuit comprising searching for said alphanumeric identifier;
storing said alphanumeric identifier and telephone number in said memory circuit if said alphanumeric identifier is not found; and
replacing information associated with said alphanumeric identifier in the memory circuit with said telephone number and alphanumeric identifier if said alphanumeric identifier is found.

29. The according to claim 28, wherein said at least one other memory circuit includes a memory circuit of a computer.

30. The system according to claim 29, wherein said computer is located in a work environment.

31. The system according to claim 29, wherein said computer is located in a home environment.

32. The system according to claim 28, wherein said telephone is adapted to receive said telephone number and alphanumeric identifier via an email, the controller being further adapted to analyze the email for a text string to indicate to said controller that said at least one telephone number and alphanumeric identifier are being sent.

33. The system according to claim 32, wherein said controller is further adapted to delete said email after said at least one telephone number and associated information have been stored in said memory circuit.

34. The system according to claim 28, wherein said telephone is adapted to receive said telephone number and alphanumeric identifier via an email, the controller being further adapted to analyze the email for a command to indicate to said controller that said at least one telephone number and alphanumeric identifier are being sent.

35. The system according to claim 34, wherein said controller is further adapted to delete said email after said at least one telephone number and associated information have been stored in said memory circuit.

36. The system according to claim 28, wherein said controller is further adapted to store at least one telephone number and associated information that has been entered by a user in said memory circuit.

37. The system according to claim 36, further comprising:
a keypad for manually entering said at least one telephone number and associated information into said controller.

38. The system according to claim 36, wherein said controller is further adapted to electronically send said at least one telephone number and information associated with said telephone number that has been entered by said user to said at least one other memory circuit.

39. The system according to claim 38, wherein said controller sends said at least one telephone number and associated information to said at least one other memory circuit via a telephone call.

40. The system according to claim 38, wherein said controller sends said at least one telephone number and associated information to said at least one other memory circuit via an email.

41. The system according to claim 40, wherein said email sent by said controller further comprises:
a text string to indicate to said at least one other memory circuit that said at least one telephone number and associated information are being sent.

42. The system according to claim 38, wherein said controller sends said at least one telephone number and associated information to said at least one other memory circuit via a page.

43. The system according to claim 42, wherein said page further comprises:
   a command to indicate to said at least one other memory circuit that said at least one telephone number and associated information are being sent.

44. The system according to claim 28, wherein said information associated with said at least one telephone number includes an alphanumeric identifier which can be used by a user to retrieve and dial said at least one telephone number.

45. The system according to claim 28, wherein said controller includes a processor.

46. A method of storing at least one telephone number and information associated with said telephone number in a plurality of databases, at least one of said plurality of databases being located in a telephone, said method comprising:
   entering said at least one telephone number and associated information into a first of said plurality of databases;
   storing said at least one telephone number and associated information in said first database;
   sending said at least one telephone number and associated information to at least one other database of said plurality of databases via an email, wherein said email contains a text string to indicate to said at least one other database that said at least one telephone number and associated information is being sent;
   receiving said at least one telephone number and associated information by said at least one other database via said email;
   parsing said email to determine if said text string is found;
   extracting said at least one telephone number and associated information if said text string is found; and
   storing said at least one telephone number and associated information in said at least one other database.

47. The method according to claim 46, wherein after said email has been received, said method further comprises:
   notifying a user of said email if said text string is not found.

48. The method according to claim 46, wherein said act of entering further comprises:
   entering said at least one telephone number and associated information including an alphanumeric identifier associated with said at least one telephone number.

49. The method according to claim 48, further comprising:
   searching said at least one other database for said entered alphanumeric identifier;
   determining if said alphanumeric identifier is already in said at least one other database;
   storing said alphanumeric identifier and telephone number and associated information in said at least one other database if said alphanumeric identifier is not found; and
   replacing stored information associated with said alphanumeric identifier with said entered telephone number and associated information if said alphanumeric identifier is found.

50. The method according to claim 46, further comprising:
   receiving a second email;
   parsing the second email to determine if the second email contains a command to indicate that the second email includes a second telephone number;
   extracting the second telephone number and storing the second telephone number if said command is found in the second email; and
   notifying a user of said email if said command is not found in the second email.

* * * * *